(12) United States Patent
Chang et al.

(10) Patent No.: US 8,379,185 B2
(45) Date of Patent: Feb. 19, 2013

(54) LIQUID CRYSTAL DISPLAY DEVICE WITH REPAIRABLE STRUCTURE

(75) Inventors: Yuan-Hao Chang, Taipei (TW); Chien-Ming Chen, Zhonghe (TW)

(73) Assignee: Chunghwa Picture Tubes, Ltd., Taoyuan County (TW)

( * ) Notice: Subject to any disclaimer, the term of this patent is extended or adjusted under 35 U.S.C. 154(b) by 0 days.

(21) Appl. No.: 12/777,692

(22) Filed: May 11, 2010

(65) Prior Publication Data

US 2011/0205460 A1 Aug. 25, 2011

(30) Foreign Application Priority Data

Feb. 25, 2010 (TW) .................................. 99203489 U

(51) Int. Cl.
*G02F 1/13* (2006.01)
(52) U.S. Cl. ...................................................... 349/192
(58) Field of Classification Search .................. None
See application file for complete search history.

(56) References Cited

U.S. PATENT DOCUMENTS

| 4,902,638 | A | * | 2/1990 | Muto ............................... 438/4 |
| 6,088,073 | A | * | 7/2000 | Hioki et al. ..................... 349/40 |
| 2001/0013910 | A1 | * | 8/2001 | Ahn et al. ........................ 349/54 |
| 2005/0001966 | A1 | * | 1/2005 | Kim et al. ..................... 349/139 |

* cited by examiner

*Primary Examiner* — Lucy Chien
(74) *Attorney, Agent, or Firm* — Ming Chow; Sinorica, LLC

(57) ABSTRACT

The present invention discloses a liquid crystal display device with repairable structure, including a glass substrate; a wire structure formed on the glass substrate, wherein the wire structure includes one or a plurality of through holes formed therein; a dielectric layer formed on the wire structure and the glass substrate; and a plurality of pixel electrodes formed on the dielectric layer, wherein one or more gaps are formed between the plurality of pixel electrodes and the position of the gaps aligns with the position of the through holes.

14 Claims, 7 Drawing Sheets

LIQUID CRYSTAL DISPLAY DEVICE WITH REPAIRABLE STRUCTURE

FIELD OF THE INVENTION

The present invention relates to liquid crystal display, and more particularly to a liquid crystal display device with repairable structure.

BACKGROUND OF THE INVENTION

Recently, the development of image display technology changes continuously and therefore liquid crystal display, which is thin and light and has low electromagnetic radiation, has become the mainstream product in the display market gradually. In the current double gate liquid crystal display device, the distance between the pixel electrodes is small because of the demand of pixel aperture ratio, such that electric conductance may happen between different pixel electrodes and cause short circuit because the pixel electrode residues may be generated in the gap between the pixel electrodes easily or foreign substances for example particles may fall into the gap between the pixel electrodes during the manufacturing procedure.

For example, FIGS. 1 and 2 illustrate a layout diagram and a cross-sectional view of a thin film transistor substrate of a traditional double gate liquid crystal display device. FIG. 2 is a cross-sectional view of FIG. 1 taken along line A-A'. Irrelevant descriptions are omitted to prevent obscuring the focus because the aforementioned prior art primarily describe the pixel electrodes and the related features thereof. Wires 102 are formed on a glass substrate 101, and a dielectric layer 103 is formed on the wires 102 and the glass substrate 101. The pixel electrodes 104 are further formed on the dielectric layer 103, and a gap 105 is formed between the pixel electrodes 104. As shown in FIGS. 3 and 4, when the pixel electrode residues are generated in the gap 105 or the foreign substances fall into the gap 105 during the manufacturing procedures, the residue 106 is formed in the gap 105 between the pixel electrodes 104. FIG. 4 is a cross-sectional view of FIG. 3 taken along line A-A'. As shown in FIG. 5, to solve the short circuit problem caused by the residue 106, the traditional repairing method utilizes laser beam 108 to aim at the residue 106 to cut off the residue 106. However, if the aforementioned repairing method is utilized to repair the traditional double gate liquid crystal display device, several problems will happen. For example, with reference to FIG. 4, when the energy of the laser beam 108 is too high, the laser beam 108 will continue to downwardly cut the underlying layer after the residue 106 is cut off. Therefore, the wires 102 will be damaged by the laser beam 108, such that light leakage problem will happen. Otherwise, when the energy of the laser beam 108 is too low, only part of the residue 106 is cut. Therefore, the residue 106 will flow down to the wires 102 because of melting state, and the residue 106 will weld with the wires 102. Therefore, the adjacent pixel electrodes 104 will keep electrically conducted with each other through the welding between the residue 106 and the wires 102, such that the short circuit problem cannot be solved.

Furthermore, a color filter substrate (not shown) is disposed on the thin film transistor substrate of the traditional double gate liquid crystal display device. A black matrix (BM) (not shown) is disposed on the color filter substrate. The black matrix is disposed in the position aligning with the wires 102 and the gap 105 between the pixel electrodes 104. Therefore, the gap 105 between the pixel electrodes 104 cannot be seen from the viewpoint above the liquid crystal display device. In other words, whether the residue 106 exists in the gap 105 or not cannot be observed from the viewpoint above the liquid crystal display device, and where the residue 106 is cannot be observed from the viewpoint above the liquid crystal display device, neither. Moreover, as shown in FIG. 4, the gap 105 between the pixel electrodes 104 cannot be seen from the viewpoint below the liquid crystal display device because the wires 102 are disposed below the gap 105 between the pixel electrodes 104. In other words, whether the residue 106 exists in the gap 105 or not cannot be observed from the viewpoint below the liquid crystal display device, and where the residue 106 is cannot be observed from the viewpoint below the liquid crystal display device, neither. Therefore, whether the residue exists or not and where the residue is cannot be identified when defective points caused by the pixel electrode residues or foreign substances are being repaired. Accordingly, there is still a need for a liquid crystal display device which can solve the aforementioned problems.

SUMMARY OF THE INVENTION

To solve the aforementioned problems of the conventional techniques, the present invention provides a liquid crystal display device with repairable structure.

In one aspect of the present invention, the present invention discloses a liquid crystal display device with repairable structure, including a glass substrate; a wire structure formed on the glass substrate, wherein the wire structure includes one or a plurality of through holes formed therein; a dielectric layer formed on the wire structure and the glass substrate; and a plurality of pixel electrodes formed on the dielectric layer, wherein one or more gaps are formed between the plurality of pixel electrodes and the position of the gaps aligns with the position of the through holes.

One advantage of the present invention is that the liquid crystal display device with repairable structure of the present invention can be easily observed whether the residue caused by the pixel electrode residues or the foreign substances exists or not and where the residue is.

Another advantage of the present invention is that the liquid crystal display device with repairable structure of the present invention can prevent the laser beam from cutting the wire when the laser beam is utilized to cut the residue, so as to prevent the light leakage problem caused by the mistakenly cut wire.

Still another advantage of the present invention is that the liquid crystal display device with repairable structure of the present invention can prevent the melt residue from welding with the wire when the laser beam is utilized to cut the residue, so as to prevent the pixel electrodes from electrically conducting each other through the welding between the residue and the wire after the residue is cut by the laser beam.

Yet another advantage of the present invention is that the pixel aperture ratio of the liquid crystal display device with repairable structure of the present invention will not be affected after defective points caused by the pixel electrode residues or foreign substances are repaired.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the Claims and wherein:

DETAILED DESCRIPTION OF THE PREFERRED EMBODIMENT

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

The present invention discloses a liquid crystal display device with repairable structure, which includes a partially-cut wire structure. The wire structure can be utilized in a thin film transistor substrate of a liquid crystal display device for example a double gate liquid crystal display device, or any other types of substrates. When the ITO (indium tin oxide) residue, i.e. the pixel electrode residue, is generated in the liquid crystal display device with repairable structure of the present invention, the position of the ITO residue (the pixel electrode residue) can be observed and be found out through the partially-cut wire structure, and then the ITO residue (the pixel electrode residue) can be cut off by using laser beam, so as to repair the liquid crystal display device.

Figure 1:
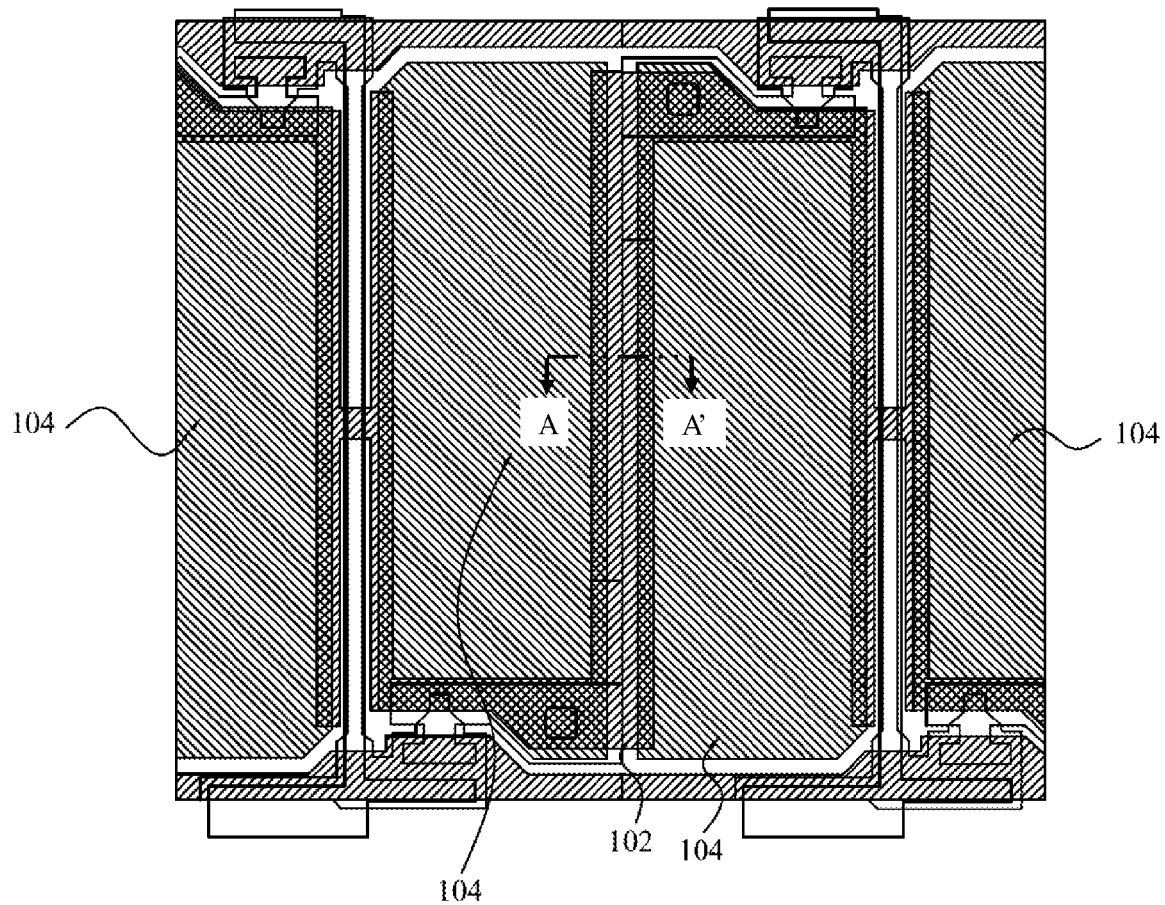
FIG. 1 illustrates a layout diagram of a thin film transistor substrate of a traditional liquid crystal display device.
Figure 2:
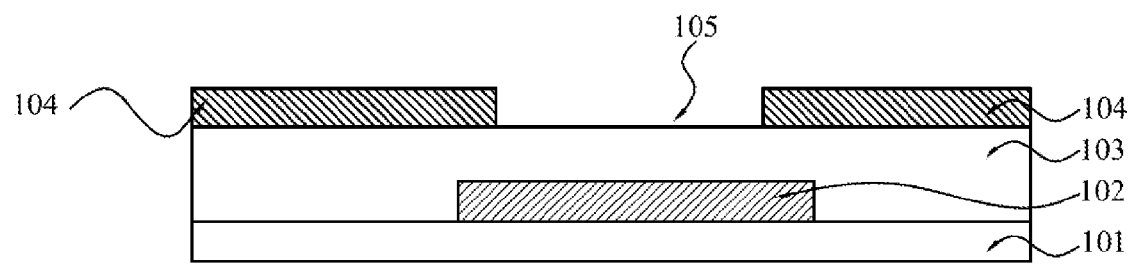
FIG. 2 illustrates a cross-sectional view of the thin film transistor substrate of the traditional liquid crystal display device.
Figure 3:
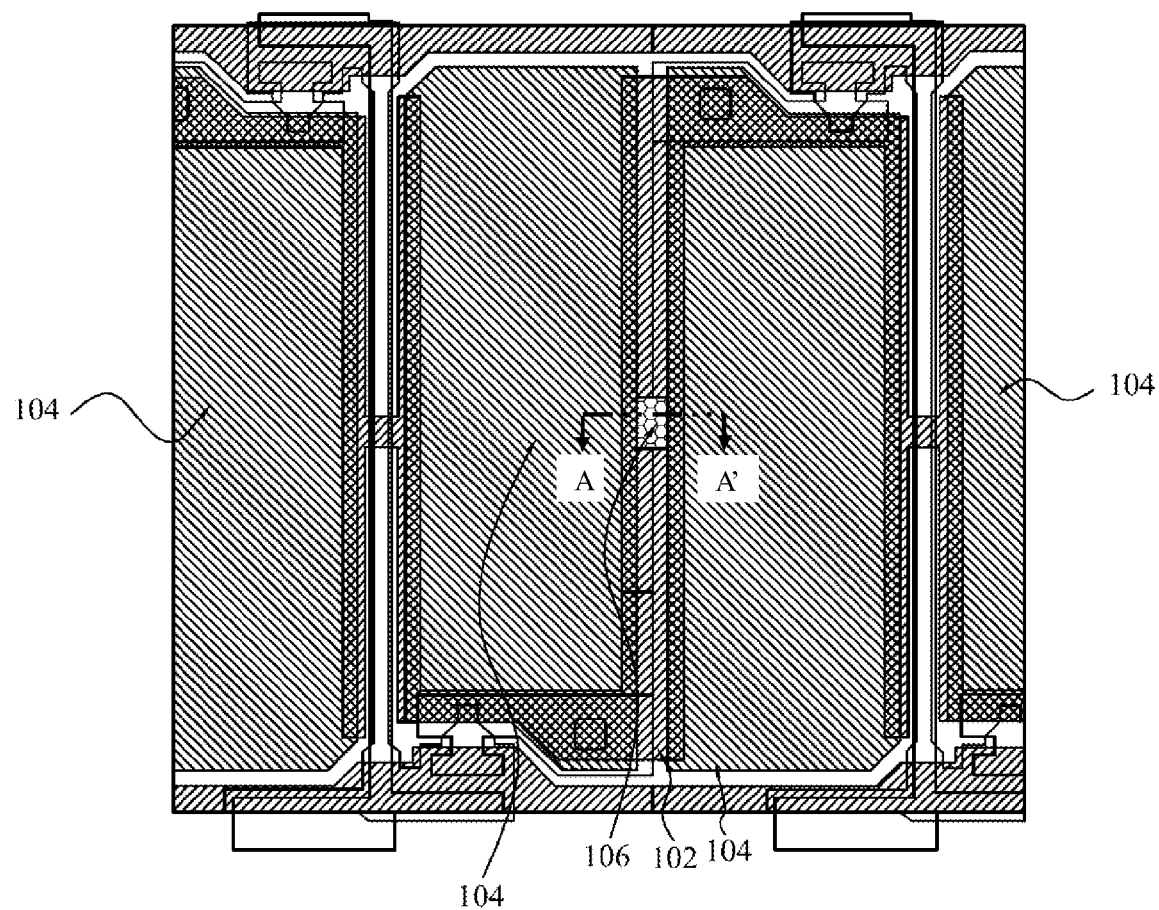
FIG. 3 illustrates a layout diagram of the thin film transistor substrate of the traditional liquid crystal display device with pixel electrode residues generated.
Figure 4:
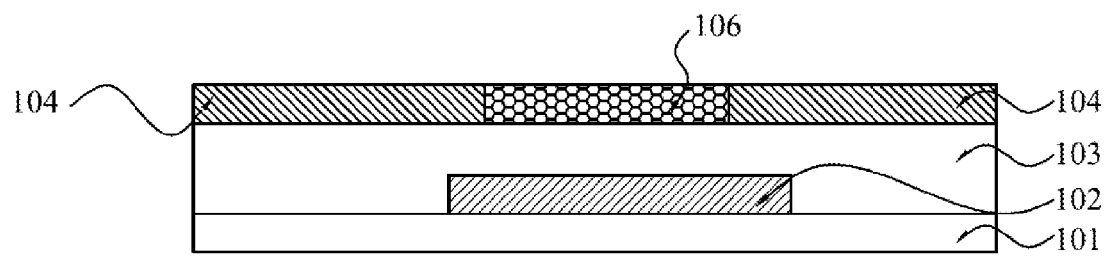
FIG. 4 illustrates a cross-sectional view of the thin film transistor substrate of the traditional liquid crystal display device with the pixel electrode residues generated.
Figure 5:
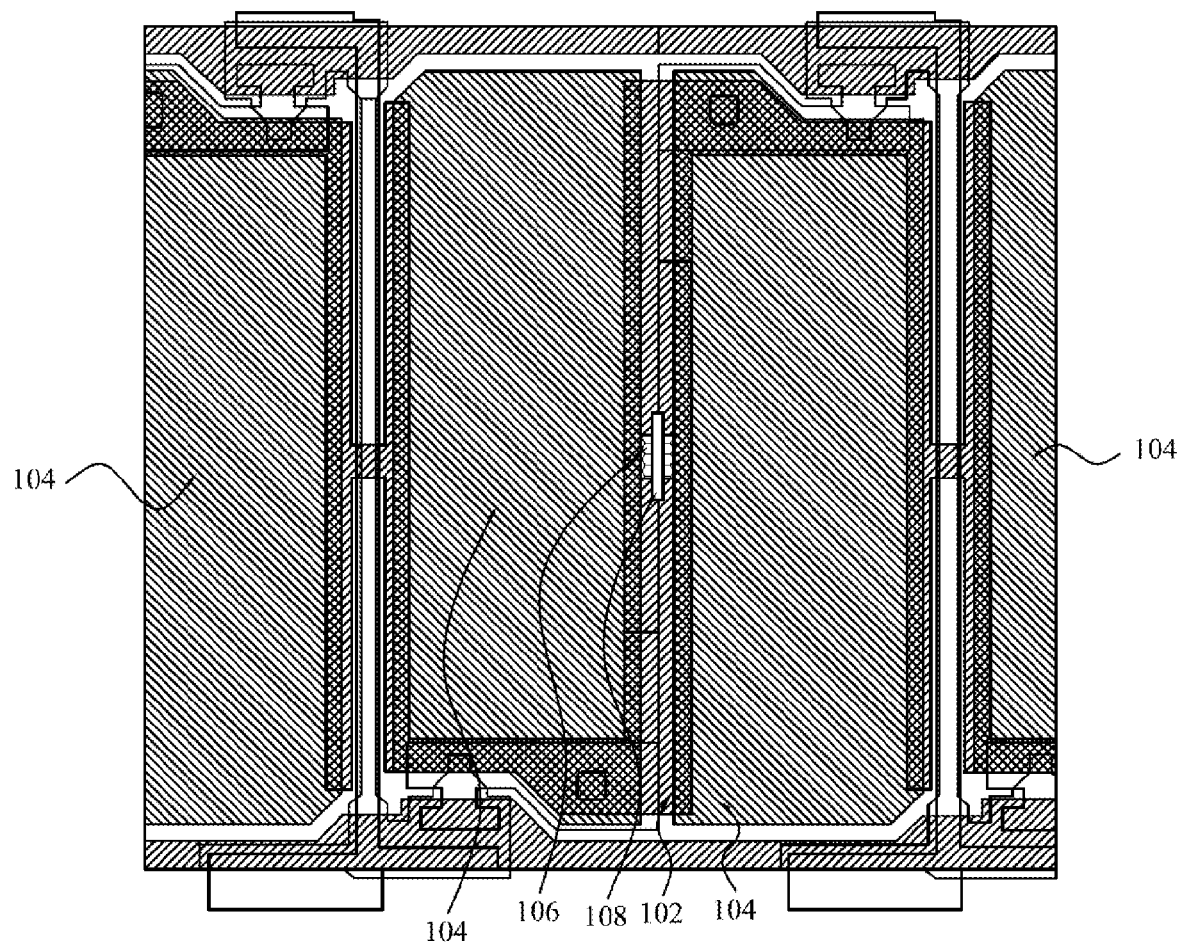
FIG. 5 illustrates a diagram showing the repairing method to the traditional liquid crystal display device with the pixel electrode residues generated.
Figure 6:
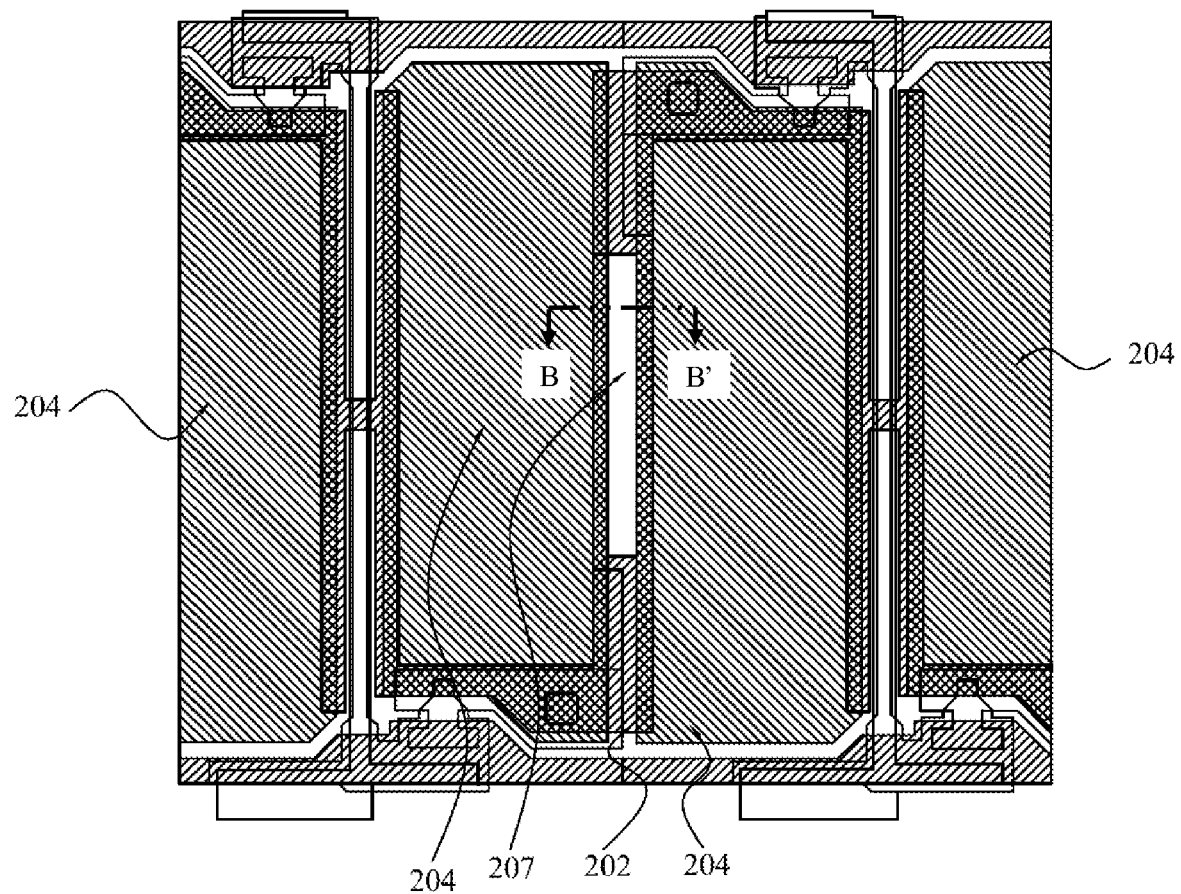
FIG. 6 illustrates a layout diagram of a thin film transistor substrate of a liquid crystal display device with repairable structure of the present invention in accordance with one embodiment of the present invention.
Figure 7:
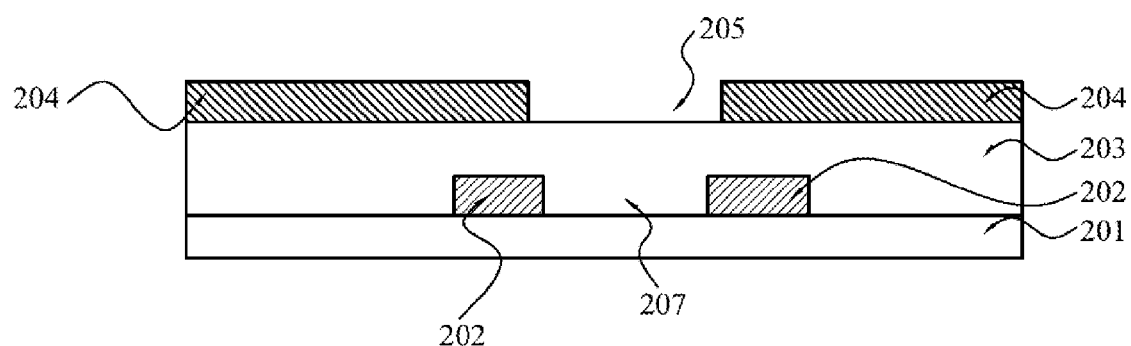
FIG. 7 illustrates a cross-sectional view of a thin film transistor substrate of a liquid crystal display device with repairable structure of the present invention in accordance with one embodiment of the present invention.

FIG. 6 illustrates a layout diagram of a thin film transistor substrate of a liquid crystal display device with repairable structure of the present invention in accordance with one embodiment of the present invention. FIG. 7 is a cross-sectional view of the wire structure in FIG. 6 taken along line B-B'. Irrelevant descriptions are omitted to prevent obscuring the focus of the present invention because the present invention primarily describe the pixel electrodes and the related features thereof. As shown in FIGS. 6 and 7, in one embodiment of the present invention, a wire structure 202 is disposed on a transparent substrate, for example a glass substrate 201, of the liquid crystal display device with repairable structure.

Figure 6A:
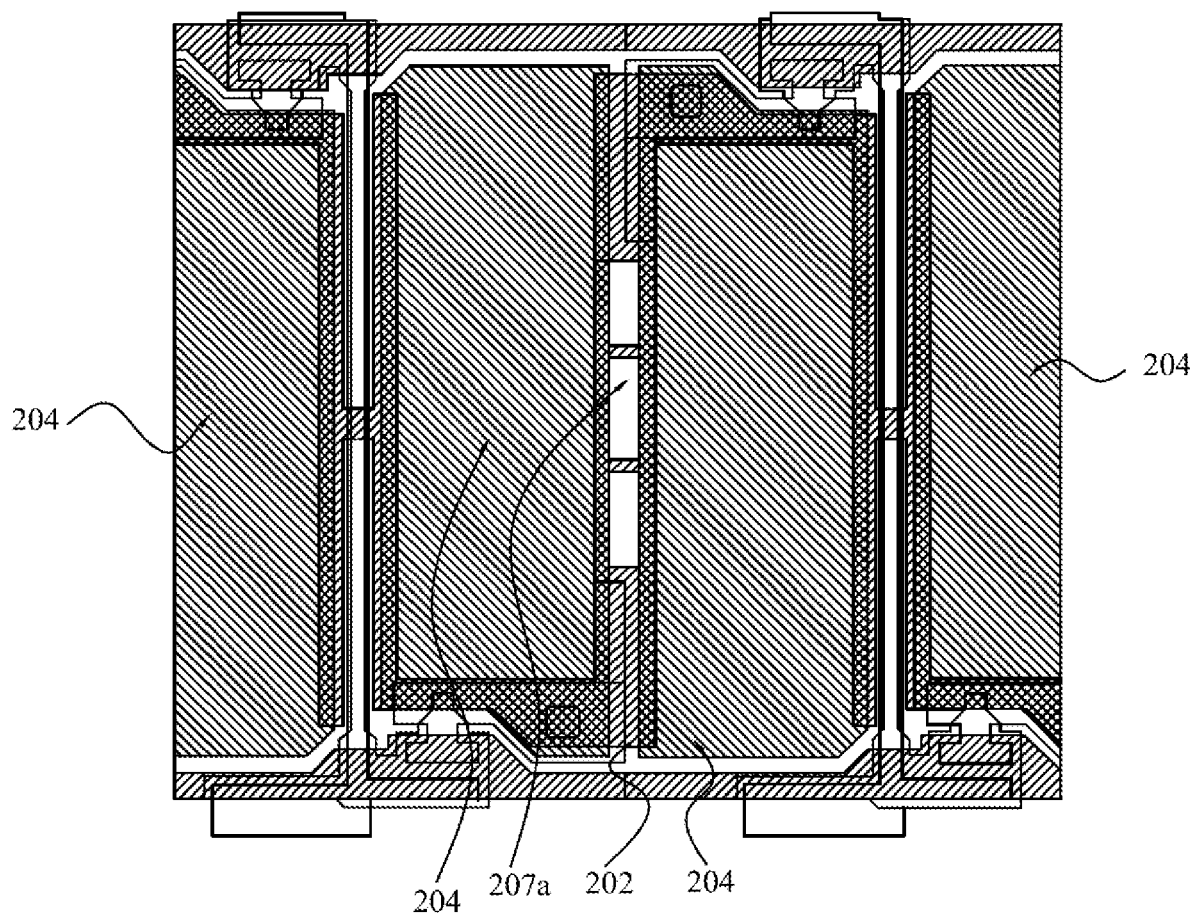
FIG. 6A illustrates a layout diagram of a thin film transistor substrate of a liquid crystal display device with repairable structure of the present invention in accordance with another embodiment of the present invention.

One or a plurality of through holes 207 are formed in the center of the wire structure 202 to expose part of the glass substrate 201. In one embodiment, the material of the wire structure 202 may be metal or alloy. It should be noted that FIG. 6 illustrates a strip-shaped through hole 207, only for illustrating the present invention but not for limiting the present invention. In another embodiment, the through hole may also be a plurality of separate strip-shaped through holes, for example three separate strip-shaped through holes 207a as shown in FIG. 6A. The plurality of strip-shaped through holes 207a are spaced apart, such that the wire structure 202 between the separate strip-shaped through holes can form electric conductance, thereby reducing the impedance. A dielectric layer 203 is disposed on the glass substrate 201 and the wire structure 202 to maintain electrical isolation, and a plurality of pixel electrodes 204 are disposed on the dielectric layer 203. In one embodiment, the dielectric layer 203 is made of transparent material. In one embodiment, the dielectric layer 203 is made of silicon nitride (SiNx). In one embodiment, the material of the pixel electrodes 204 may be indium tin oxide (ITO) or indium zinc oxide (IZO).

The pixel electrodes 204 are spaced apart in a distance, such that one or more gaps 205 are formed between the pixel electrodes 204. The positions of the gaps 205 align with the positions of the through holes 207. In one embodiment of the present invention, the horizontal positions of the gaps 205 align with the horizontal positions of the through holes 207. As shown in FIG. 7, in one embodiment, the width of the gaps 205 may be larger than the width of the through holes 207. In another embodiment, the width of the gaps 205 may be smaller than the width of the through holes 207. The user can observe through the through hole 207 of the wire structure 202 from the viewpoint below the glass substrate 201 to see if the residue is generated in the gap 205 because the glass substrate 201 and the dielectric layer 203 are transparent.

Figure 8:
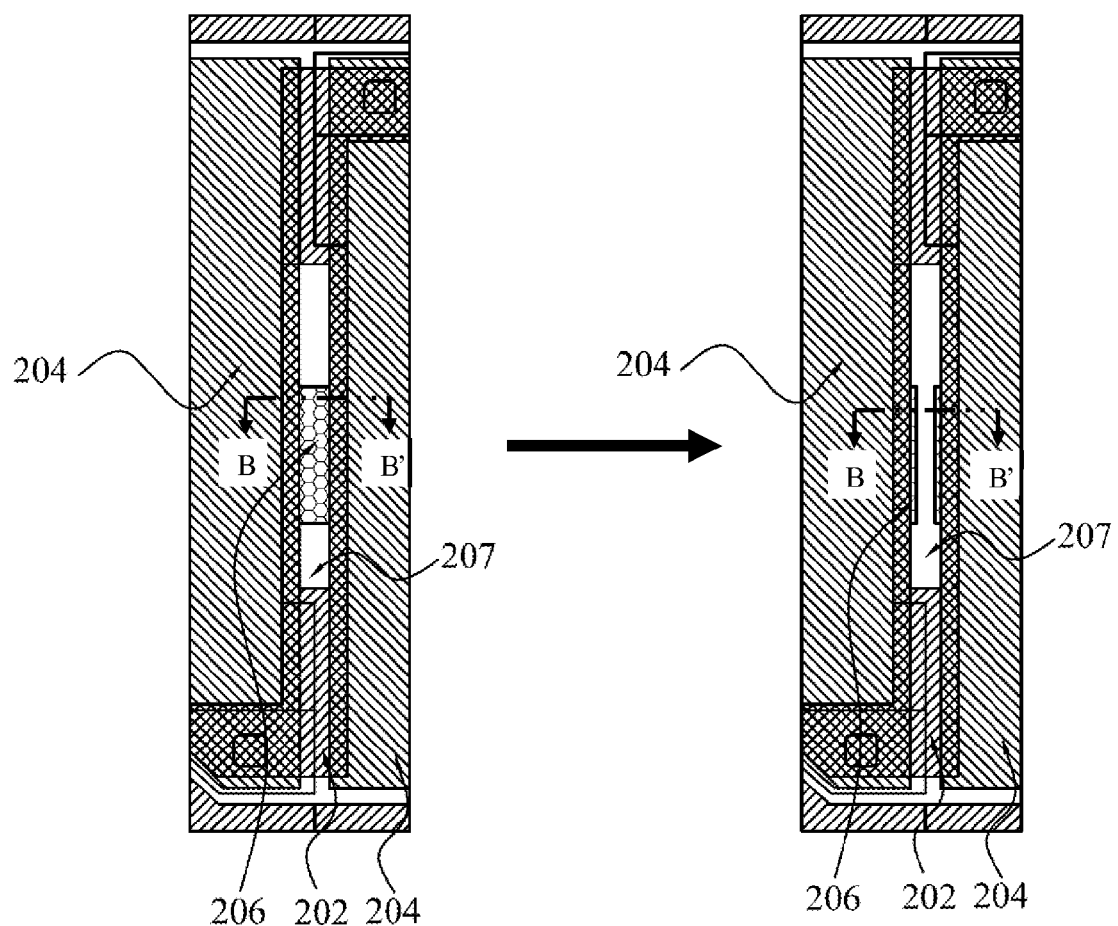
FIG. 8 illustrates a diagram showing the repairing method to the liquid crystal display device with repairable structure with the pixel electrode residues generated in accordance with one embodiment of the present invention.
Figure 9:
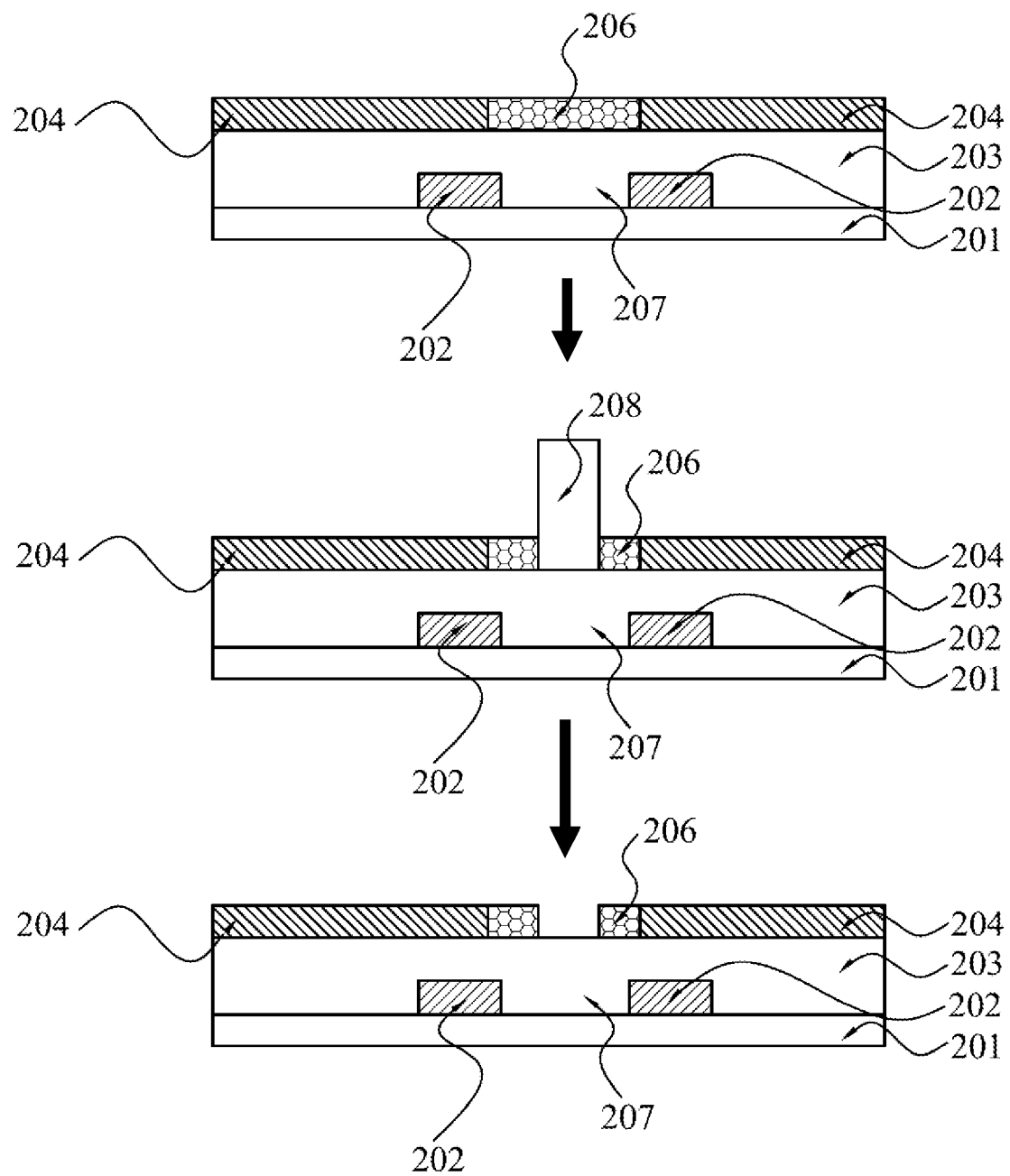
FIG. 9 illustrates a flow diagram of the repairing method to the liquid crystal display device with repairable structure with the pixel electrode residues generated in accordance with one embodiment of the present invention.

FIG. 9 is a cross-sectional view of FIG. 8 taken along the line B-B'. As shown in FIGS. 8 and 9, when the ITO or IZO residue is generated in the gap or foreign substances, for example particles, fall into the gap during the manufacturing procedures of the liquid crystal display device with repairable structure, the residue 206 is formed. Defect points will appear on the liquid crystal display device with repairable structure because the residue 206 caused by the ITO or IZO or the foreign substances will cause electric conductance between the pixel electrodes 204 and then induce short circuit issue. To solve the short circuit problem, the user can observe through the through hole 207 of the wire structure 202 of the present invention from the viewpoint below the glass substrate 201 to see where the residue 206 is, and then employ the laser beam 208 to aim at the residue 206, so as to cut off the residue 206, thereby the short circuit formed between the pixel electrodes 204 can be separated and the defect point problems caused by the residue 206 between the pixel electrodes 204 can be repaired.

Furthermore, the position of the through holes 207 of the wire structure 202 of the present invention aligns with the position of the gap between the pixel electrodes 204, i.e. the position of the residue 206. Therefore, when the energy of the laser beam 208 is too high and the laser beam 208 continues to cut downwards, the laser beam 208 will pass through the through holes 207 and the wire structure 202 will not be cut because the dielectric layer 203 and the glass substrate 201 are transparent. Therefore, the present invention can prevent the wire from being cut by the laser beam 208 when the laser beam 208 is utilized to cut the residue 206, so as to prevent the light leakage problem caused by the mistakenly cut wire. Moreover, as aforementioned, the position of the through holes 207 of the wire structure 202 of the present invention aligns with the position of the gap between the pixel electrodes 204, i.e. the position of the residue 206. Therefore, when the energy of the laser beam 208 is too low and then the cut residue 206 melts and flows downwards, the melted residue 206 will not weld with the wire structure 202. Therefore, the present invention can prevent the melt residue 206 from welding with the wire when the laser beam 208 is utilized to cut the residue 206, so as to prevent the pixel electrodes 204 from electrically conducting each other through the welding between the residue 206 and the wire after the residue 206 is cut by the laser beam 208.

Furthermore, the pixel aperture ratio will not be affected after the liquid crystal display device is repaired because the wire structure 202 of the present invention can prevent the light leakage problem caused by the wire which is mistakenly cut by the laser. If the light leakage problem happens, the range of the black matrix (BM) (not shown) on the color filter substrate (not shown) above the thin film transistor substrate of the liquid crystal display device with repairable structure must increase to shelter the leaked light. The larger the range of the black matrix is, the smaller the range of the pixel electrodes 204 in the display region of the liquid crystal display device with repairable structure is, such that the pixel aperture ratio will decrease. The wire structure 202 of the present invention can prevent the light leakage problem, such that the range of the black matrix needs not to be increased. Therefore, the pixel aperture ratio will not decrease. Moreover, the user can easily observe through the through hole 207 from the viewpoint below the glass substrate 201 to see whether the residue exists or not or where the residue is because the position of the through hole 207 of the wire structure 202 of the present invention aligns with the position of the gap 205 and the glass substrate 201 and the dielectric layer 203 are transparent, such that the repairing procedure can be performed more easily.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A liquid crystal display device with repairable structure, comprising:
   a transparent substrate;
   a wire structure formed on said transparent substrate, wherein said wire structure comprises one or a plurality of through holes formed therein;
   a dielectric layer formed on said wire structure and said transparent substrate; and
   a plurality of pixel electrodes formed on said dielectric layer, wherein one or more gaps are formed between said plurality of pixel electrodes and a position of said gaps aligns with a position of said through holes, so as to observe whether there is a need for repair.

2. The liquid crystal display device with repairable structure as claimed in claim 1, wherein said transparent substrate comprises a glass substrate.

3. The liquid crystal display device with repairable structure as claimed in claim 1, wherein the width of said gaps is larger than the width of said through holes.

4. The liquid crystal display device with repairable structure as claimed in claim 1, wherein the width of said gaps is smaller than the width of said through holes.

5. The liquid crystal display device with repairable structure as claimed in claim 1, wherein said through holes are formed in the center of said wire structures.

6. The liquid crystal display device with repairable structure as claimed in claim 1, wherein said through holes are strip-shaped.

7. The liquid crystal display device with repairable structure as claimed in claim 1, wherein said dielectric layer is transparent.

8. The liquid crystal display device with repairable structure as claimed in claim 1, wherein the material of said pixel electrodes comprises indium tin oxide (ITO).

9. The liquid crystal display device with repairable structure as claimed in claim 1, wherein the material of said pixel electrodes comprises indium zinc oxide (IZO).

10. The liquid crystal display device with repairable structure as claimed in claim 1, wherein the material of said dielectric layer comprises silicon nitride (SiNx).

11. The liquid crystal display device with repairable structure as claimed in claim 1, wherein the material of said wire structure comprises metal.

12. The liquid crystal display device with repairable structure as claimed in claim 1, wherein the material of said wire structure comprises alloy.

13. The liquid crystal display device with repairable structure as claimed in claim 1, wherein said position of said gaps comprises a horizontal position of said gaps and said position of said through holes comprises a horizontal position of said through holes.

14. The liquid crystal display device with repairable structure as claimed in claim 1, wherein said liquid crystal display device comprises a double gate liquid crystal display device.

* * * * *